(12) United States Patent
Norris et al.

(10) Patent No.: US 8,069,991 B2
(45) Date of Patent: Dec. 6, 2011

(54) SYSTEM AND METHOD FOR LIQUID FILTRATION WITH REDUCED HOLD-UP VOLUME

(75) Inventors: Douglas A. D. Norris, Clemmons, NC (US); Timothy W. Towle, Lee, NH (US)

(73) Assignee: Entegris, Inc., Billerica, MA (US)

( * ) Notice: Subject to any disclaimer, the term of this patent is extended or adjusted under 35 U.S.C. 154(b) by 356 days.

(21) Appl. No.: 12/308,230

(22) PCT Filed: Jun. 13, 2007

(86) PCT No.: PCT/US2007/013833
§ 371 (c)(1),
(2), (4) Date: Dec. 10, 2008

(87) PCT Pub. No.: WO2007/149273
PCT Pub. Date: Dec. 27, 2007

(65) Prior Publication Data
US 2009/0194475 A1      Aug. 6, 2009

Related U.S. Application Data

(60) Provisional application No. 60/815,375, filed on Jun. 21, 2006.

(51) Int. Cl.
*B01D 27/06* (2006.01)
*B01D 27/07* (2006.01)
*B65C 9/25* (2006.01)

(52) U.S. Cl. ............. 210/493.1; 210/493.2; 210/321.86; 210/455; 210/443; 210/456; 156/322

(58) Field of Classification Search ................. 210/295, 210/456, 443, 455, 321.6, 493.2, 321.86, 210/493.1; 156/322
See application file for complete search history.

(56) References Cited

U.S. PATENT DOCUMENTS

| 4,490,254 | A | | 12/1984 | Gordon et al. |
| 4,655,914 | A | | 4/1987 | Wada |
| 4,806,135 | A | | 2/1989 | Siposs |
| 4,966,701 | A | | 10/1990 | Goodman et al. |
| 4,997,556 | A | * | 3/1991 | Yano et al. .................... 210/136 |

(Continued)

FOREIGN PATENT DOCUMENTS

DE        20122        11/1882

(Continued)

OTHER PUBLICATIONS

International Search Report for PCT/US2007/013833, filed Jun. 13, 2007.

(Continued)

*Primary Examiner* — Ana Fortuna
(74) *Attorney, Agent, or Firm* — Hamilton, Brook, Smith & Reynolds, P.C.

(57) ABSTRACT

In one embodiment according to the invention, there is provided a filter device for liquid filtration, the filter device being in fluid communication with a plurality of liquid pathways, at least one pathway of the plurality of liquid pathways having a smallest equivalent fluid flow diameter of the plurality of liquid pathways. The device comprises a filter membrane (108) and a filter core (109) comprising at least one cross hole (110) in fluid communication with the filter membrane, each cross hole having an equivalent fluid flow, diameter. The sum of the equivalent fluid flow diameters of the at least one cross holes does not exceed the smallest equivalent fluid flow diameter of the plurality of liquid pathways.

10 Claims, 7 Drawing Sheets

U.S. PATENT DOCUMENTS

| | | | |
|---|---|---|---|
| 5,556,542 A * | 9/1996 | Berman et al. | 210/232 |
| 5,620,599 A | 4/1997 | Hopkins et al. | |
| 5,762,789 A | 6/1998 | Del Los Reyes et al. | |
| 6,016,923 A * | 1/2000 | Baumann | 210/440 |
| 7,021,667 B2 | 4/2006 | Campbell et al. | |
| 7,037,424 B2 | 5/2006 | Niermeyer et al. | |
| 7,195,122 B2 * | 3/2007 | Hiranaga et al. | 210/436 |
| 7,296,582 B2 | 11/2007 | Campbell et al. | |
| 7,350,821 B2 | 4/2008 | Campbell et al. | |
| 2003/0213736 A1 * | 11/2003 | Hiranaga et al. | 210/232 |
| 2004/0070201 A1 | 4/2004 | Niermeyer et al. | |

FOREIGN PATENT DOCUMENTS

| | | |
|---|---|---|
| GB | 435510 | 9/1935 |
| GB | 801249 | 9/1958 |
| GB | 2150456 | 7/1985 |
| GB | 2159064 | 11/1985 |
| JP | 05-111622 A | 5/1993 |
| WO | WO 98/09704 | 3/1998 |
| WO | WO 2004/080568 A1 | 9/2004 |

OTHER PUBLICATIONS

International Preliminary Report on Patentability for PCT/US2007/013833, filed Jun. 13, 2007.

Entegris, Inc. Product Brochure for Impact® Mini Disposable Filters; Oct. 2006.

Entegris, Inc. Product Brochure for Impact® 2 Disposable Filters; Aug. 2006.

Entegris, Inc. Product Brochure for Impact® 2 V2 Disposable Filers; Feb. 2008.

Entegris, Inc. Product Brochure for Impact® 2-Duo Disposable Filters; Jul. 2007.

European Office Action dated Aug. 17, 2009, issued in European Patent Application No. 07796035.9-2113 (3 pages).

* cited by examiner

SYSTEM AND METHOD FOR LIQUID FILTRATION WITH REDUCED HOLD-UP VOLUME

RELATED APPLICATION

This application is the U.S. National Stage of International Application No. PCT/US2007/013833, filed Jun. 13, 2007, published in English, and claims the benefit of U.S. Provisional Application No. 60/815,375, filed on Jun. 21, 2006, the entire contents of which are incorporated herein by reference.

BACKGROUND OF THE INVENTION

Conventional filter devices, used in fields such as the point-of-use filtration of chemicals used in semiconductor manufacturing, are of two types: disposable devices and cartridge filters.

Despite advances in the field, disposable devices typically have excessively large internal flow channels, which are larger than the equivalent inlet and outlet ports and/or tubing and piping leading to and from the device. These large flow channels result in unnecessary hold-up volume and increases in pressure drop, due to expansions and contractions in the fluid flow path. Pressure fluctuations caused by the expansions and contractions can cause bubbles in the fluid that is being filtered to come out of solution. Increased pressure drop is detrimental to fluid processes that are sensitive to outgassing. The higher pressure required results in more dissolved gas and a greater occurrence of outgassing. Outgassing relates directly to defects in end use. Furthermore, the large flow channels mean that there are more places for bubbles to become trapped or for bubble nucleation to occur. Also, a larger amount of hold-up volume causes the filter to take a longer amount of time to prime and flush to background particle levels before use.

Cartridge filters, by definition, are used within a housing and thus typically have large flow channels between the housing and the filter. Thus, they suffer from similar problems produced by unnecessary hold-up volume.

As examples of the prior art, U.S. Pat. No. 5,620,599 of Hopkins et al. discloses a cartridge filter in which a sleeve or cage occupies typically 80% of the volume between the filter and the housing; and U.S. Pat. No. 5,762,789 of de los Reyes et al. discloses a disposable filter with low dead volume, in which a sweeping flow action improves the flow pattern.

Given the high cost of the process fluids used in fields such as semiconductor manufacturing, such as photoresists, dielectrics, anti-reflectives and optical disc materials, and the need to avoid defects produced by bubbles and other causes, the reduction of filter hold-up volume and reduction of flush-up time are critical. Although there have been efforts to reduce hold-up volume and flush-up time, there is therefore an ongoing need to reduce hold-up volume and flush-up time without increasing the pressure drop across the filter.

SUMMARY OF THE INVENTION

In one embodiment according to the invention, there is provided a filter device for liquid filtration, the filter device being in fluid communication with a plurality of liquid pathways, at least one pathway of the plurality of liquid pathways having a smallest equivalent fluid flow diameter of the plurality of liquid pathways. The device comprises a filter membrane, and a filter core comprising at least one cross hole in fluid communication with the filter membrane, each cross hole having an equivalent fluid flow diameter. The sum of the equivalent fluid flow diameters of the at least one cross holes does not exceed the smallest equivalent fluid flow diameter of the plurality of liquid pathways. The filter device may comprise a bottom cap supporting the filter membrane, and a filter bowl surrounding the filter membrane, wherein the filter core, bottom cap, and filter bowl are optionally formed into a unitary structure. The filter bowl may comprise a vertical fluid channel in fluid communication with a bottom inside surface of the filter bowl. The vertical fluid channel may comprise a variable cross sectional area, which may reach a minimum nearest the bottom inside surface of the filter bowl. An external surface of the filter core may be grooveless.

In another embodiment according to the invention, there is provided a filter device for liquid filtration. The filter device comprises a filter membrane in fluid communication with an outlet port, and a filter core comprising at least one cross hole in fluid communication with the filter membrane. At least one of the cross holes is located in a top surface of the filter core and in fluid communication with the outlet port. The at least one cross holes may be configured such that the sum of their equivalent fluid flow diameters does not exceed the smallest equivalent fluid flow diameter of a plurality of liquid pathways that are in fluid communication with the filter device. The filter core may comprise an internal fluid pathway in fluid communication with the outlet port, and the internal fluid pathway may have an equivalent fluid flow diameter that does not exceed a smallest equivalent fluid flow diameter of a plurality of liquid pathways in fluid communication with the filter device. The internal fluid pathway may be of a variable cross sectional diameter.

In a further embodiment, there is provided a process for manufacturing a filter device. The process comprises heating a top cap of the filter device to an elevated temperature at which a filter membrane may be joined to the top cap; inserting a fixturing device into a central flow passageway of the filter device; joining the filter membrane to the top cap at the elevated temperature; and removing the fixturing device after the top cap has cooled below the elevated temperature.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of preferred embodiments of the invention follows.

In accordance with a first embodiment of the invention, there is provided a disposable filter device that achieves a significantly reduced hold-up volume and reduced flush-up time by comparison with previous devices, without appreciably increasing the pressure drop across the device. The reduced hold-up volume and reduced flush-up time are achieved by a number of features.

The filter device does not have a cage or sleeve surrounding the filter, since a cage is not necessary to protect the filter when housed inside a disposable container. As used herein, a disposable filter device is one that can be installed and removed as a unit and can be disposed of after removal. When the filter membrane within the module needs replacement, the entire filter device is removed from the system in which it is used, and disposed of.

The outer diameter of the filter is a tight fit inside the bowl of the container. By a "tight fit," it is intended that the fit should be tight enough to support the filter medium against fluid backpressure, but not tight enough to block fluid flow through any necessary channels. Although a fluid channel down the side of the bowl may be used to communicate fluid to the bottom of the device and sweep the bottom of the bowl, the fluid is also able to travel down the pleats of the filter. The tight fit between the filter medium and the bowl provides the advantage of supporting the filter medium under fluid backpressure into the bowl.

The core of the filter device has no grooves. Instead of using a grooved core to convey fluid from the filter membrane to the outlet of the device, as in the conventional technique, the support members of the filter membrane, which are typically formed of a polymeric mesh, and the pleats of the filter membrane are used to convey the fluid to cross holes in the core, which lead the fluid to the outlet.

The filter core features a minimal number of cross holes (for example, one or two cross holes) to convey fluid from the filter membrane to the outlet of the device, and at least one cross hole at or near the top surface of the filter core to assist in venting air through the filter membrane during priming of the device, and subsequently in conveying fluid to the outlet of the device. By comparison with conventional devices that use a larger number of cross holes, and have no cross hole at or near the top surface of the filter core, such a use of cross holes decreases the device's hold-up volume and flush-up time. In addition, the use of at least one cross hole at or near the top surface of the filter core prevents air trapping at the top of the fluid chamber, which can be a significant problem in previous designs.

The filter core flow channels are matched to the inlet and outlet flow paths of the filter device according to a flow balancing principle described further below. In particular, the sum of the equivalent diameters of the cross holes in the core may be equal to the equivalent diameter of the smallest liquid flow path that is in fluid communication with the filter device (for example, the equivalent diameter of the outlet flow path), as described further below.

A small flow path is used between the bottom cap and the bowl of the filter device, in order to allow sweeping of the bottom of the bowl while maintaining as small a hold-up volume as possible. By a "small flow path," it is intended that the flow path be large enough to allow sweeping of the bowl, but not so large as to undesirably increase hold-up volume. For example, the flow path under the bottom cap may eliminate as much as 2 cc or more of hold-up volume by comparison with prior devices. The sweeping of the bottom of the bowl assists in the removal of bubbles from the fluid and in the elimination of dead volume in the fluid flow path. Such a flow path beneath the bottom cap may be matched to the inlet and outlet flow paths according to the flow balancing principle described further below.

As described further below, the filter's top cap may be joined to the device by a process that uses a fixturing pin to prevent molten plastic resulting from the welding, potting, or other joining process from interfering with the fluid flow path. Chamfered edges or counterbores may be used to receive the molten plastic.

Using features such as the above, a first embodiment according to the invention is able to achieve a hold-up volume of less than about 20 ml where previous devices used in a similar context had a hold-up volume of more than 40 ml, thereby greatly improving the performance of the filter device (although the specific figures should not be taken as limiting and are given as examples only).

Figure 1A:
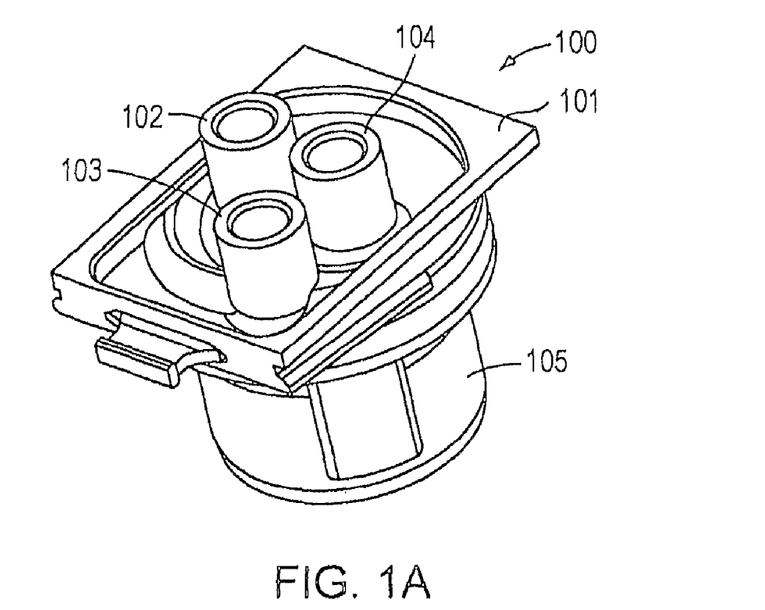
FIG. 1A shows the outside of a disposable filter device according to a first embodiment of the invention.

FIG. 1A shows the outside of a disposable pleated membrane filter device 100 according to a first embodiment of the invention. The filter device includes a head section 101 in which are located at least three ports 102, 103, and 104 including an inlet 104, an outlet 102, and a vent 103, which are in fluid communication with the interior of the filter device 100; and a bowl 105.

Figure 1B:
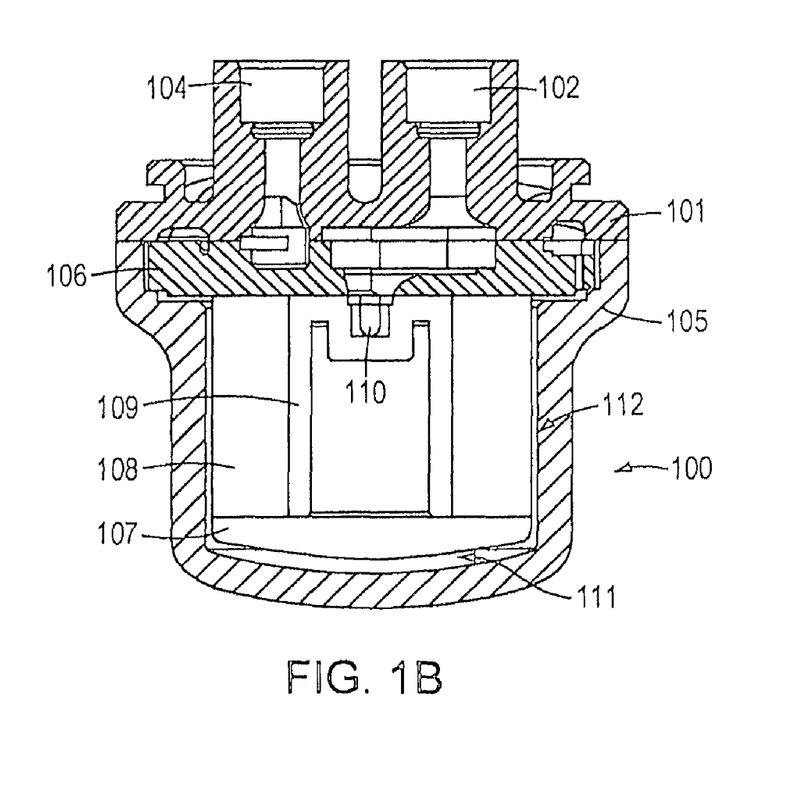
FIG. 1B shows a cross-sectional view of the filter device of FIG. 1A.

FIG. 1B shows a cross-sectional view of the filter device 100 of FIG. 1A. Ports 102 and 104 are in fluid communication with the interior of the filter device 100, in which is contained a filter cartridge formed of a top cap 106, a bottom cap 107, a filter membrane 108, and a core 109. A cross hole 110 is formed at or near the top surface of the core 109 (in this case, at the top surface), and assists in venting air through the filter membrane during priming of the device. As the device is first filling with fluid during the priming of the device, prior devices, which do not have such a cross hole at or near the top surface of the core, may trap air near the top of the core. By providing cross hole 110, however, such a problem during priming is alleviated, so that air and other gases may be vented through outlet 102 during priming. Once the device is filled, the cross hole 110 is used to convey fluid that has been filtered by the membrane 108 to the outlet 102. As used herein, "cross hole" refers to a flow passage extending across a diameter (or another chord or section) of the filter core, and being open on both of its ends to fluid flow into the core. The sum of the equivalent diameters of the cross hole 110 and any other cross holes in the core may be matched to the liquid flow paths that are in fluid communication with the device, in accordance with the flow balancing principle described further below. A small volume 111 between the bottom cap 107 and the bowl 105 allows fluid to sweep the bottom of the bowl 105. The flow path through volume 111 may also have an equivalent diameter that is matched to the flow paths to the device, in accordance with the flow balancing principle described further below. The filter membrane 108 may be a pleated membrane, and forms a tight fit 112 with the filter bowl 105 so that the filter medium is supported under fluid backpressure into the bowl. No cage or sleeve surrounds the filter medium 108. The top cap 106, core 109, bottom cap 107, and bowl 105 may be molded components, and may be formed, for example, of high density polyethylene. The head section 101 may be a standard head used with other filter devices used in a similar context, such as the IMPACT® 2 head, sold by Entegris, Inc. of Chaska, Minn.

Figure 2:
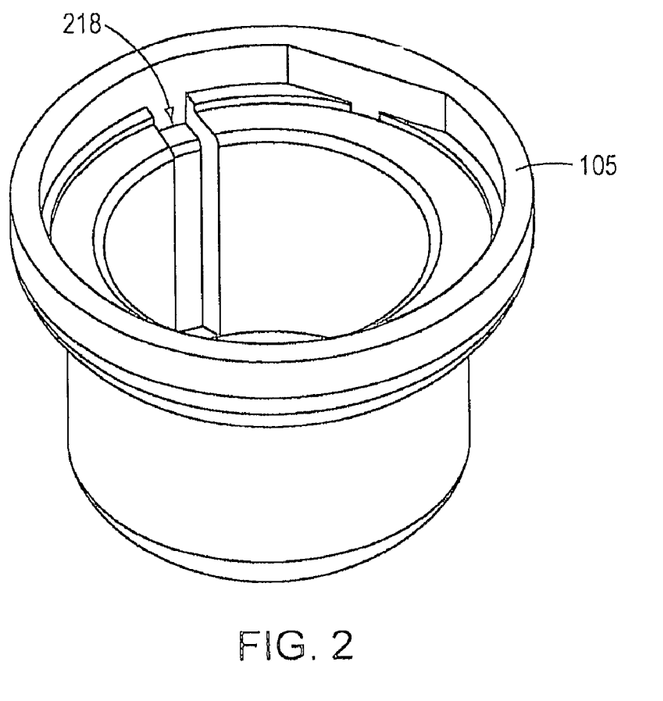
FIG. 2 is a view of the bowl of the filter device of the embodiment of FIGS. 1A and 1B.

FIG. 2 is a view of the bowl 105 of the embodiment of FIGS. 1A and 1B. Although the filter membrane 108 of FIG. 1B forms a tight fit with the bowl 105, a small vertical fluid channel 218 is used to convey fluid to the bottom of the bowl 105. The fluid channel 218 has a variable cross section, which is larger near the top of the bowl 105 and tapers towards a smaller cross section at the bottom of the bowl 105. The fluid channel 218 communicates fluid to the bottom of the device and allows the fluid to sweep the bottom of the bowl 105, which assists in the removal of bubbles from the fluid and in the elimination of dead volume in the fluid flow path. Because the fluid channel 218 has a cross sectional area that decreases as the fluid travels deeper into the bowl 105, the fluid speed increases as it travels down the fluid channel 218 and reaches a maximum fluid speed at the bottom of the bowl 105, where it exits the channel 218 and sweeps under the bottom cap 107. Because the fluid has reached a maximum speed at the bottom of the bowl 105, its sweeping under the bottom cap 107 is more effective. Furthermore, as the fluid travels down the channel 218, more of the fluid passes through the membrane 108. Thus, less cross sectional area, and hence less hold-up volume, is needed further down the channel 218, because there is progressively less fluid.

In addition to traveling through the fluid channel 218, the fluid is also able to travel down the pleats of the filter membrane 108.

Figure 3:
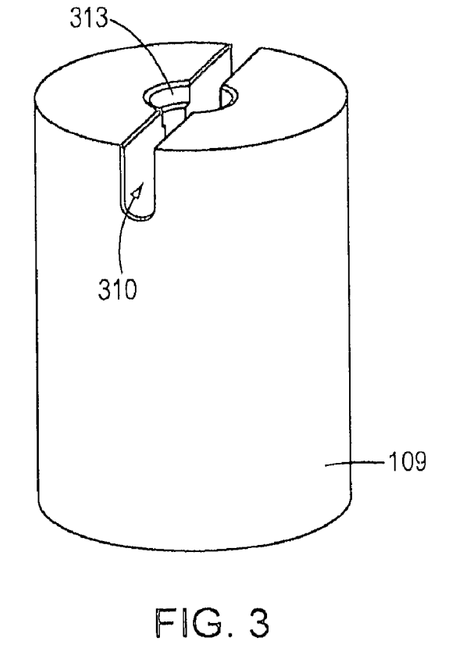
FIG. 3 is a view of the filter core of the filter device of the embodiment of FIG. 1B.

FIG. 3 is a view of the filter core 109 of the embodiment of FIG. 1B. The cross hole 310 is in fluid communication with an internal core volume 313 formed in the top surface of the core, which in turn is in fluid communication with the outlet port 102 (FIG. 1B), so that the cross hole 310 assists in venting during priming of the device, and subsequently conveys fluid to the outlet 102 (FIG. 1B). The internal core volume 313 is preferably centrally located, but may also be located at other positions in the filter device to be in fluid communication with an outlet 102. As can be seen by the smoothness of core 109 in FIG. 3, the external surface of the core 109 has no grooves, instead relying on the support members of the filter membrane (typically a polymeric mesh) and the pleats of the filter medium to convey the fluid to the cross hole 310 in the core, which in turn leads the fluid to the outlet port 102 (FIG. 1B).

Figure 4A:
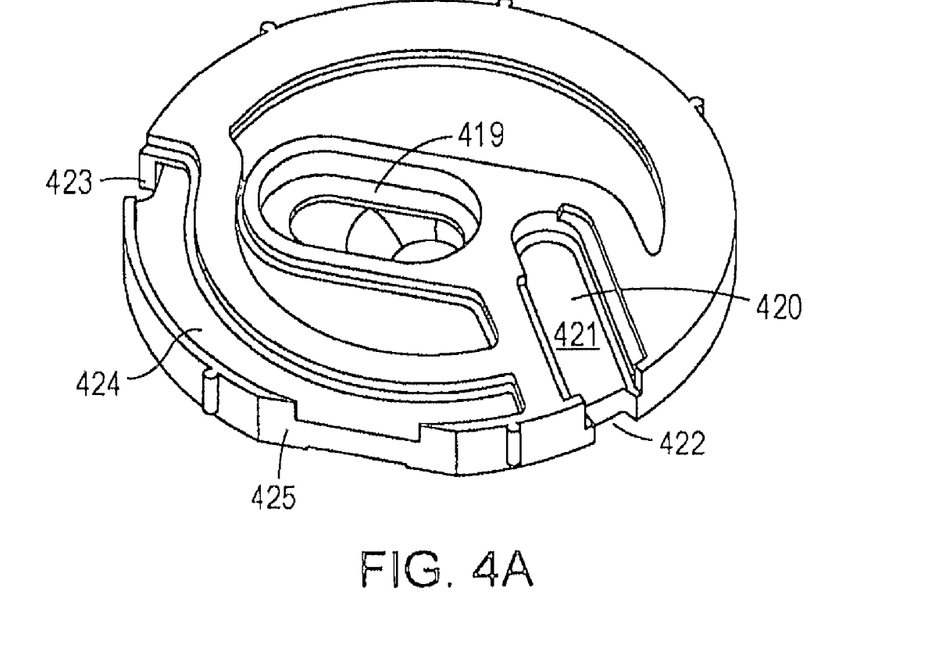
FIG. 4A is a top view of the top cap of the embodiment of FIG. 1B.

FIG. 4A is a top view of the top cap 106 of the embodiment of FIG. 1B. The top cap 106 is thermally bonded to the head section 101 (although other means of bonding or attachment may be used). A central opening 419 in the top cap 106 is in fluid communication with the outlet port 102, and a slot 420 is in fluid communication with the inlet port 104. An inset portion 421 of the inlet slot 420 leads fluid to a notch 422 located at the edge of the top cap 106, which in turn opens into the fluid channel 218 of the bowl of FIG. 2. A notch 423 and passage 424 form part of the vent flow pathway, and passage 424 is in fluid communication with the vent port 103. A keying portion 425 may be used to orient the top cap 106 to the head section 101 during manufacturing.

Figure 4B:
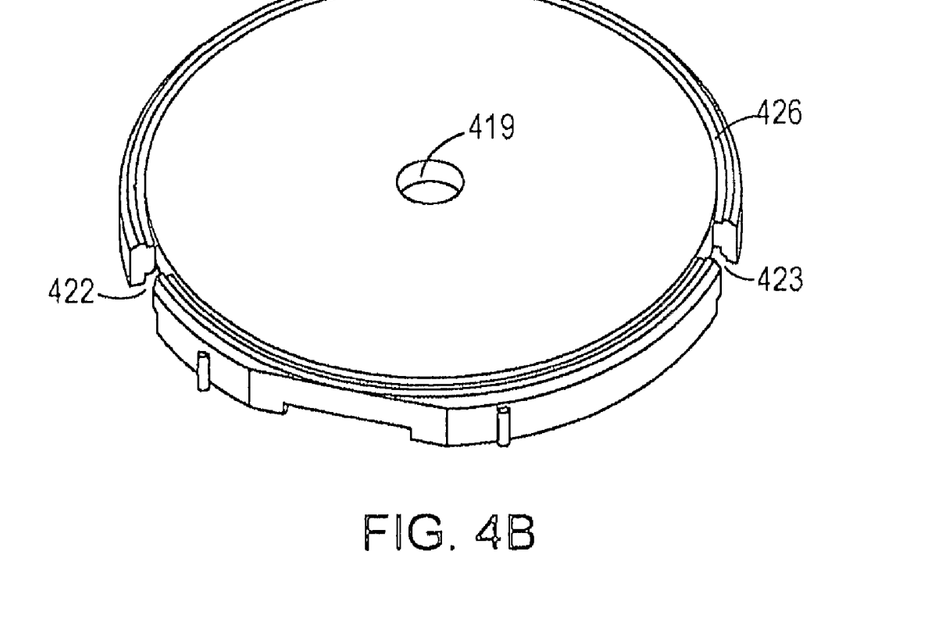
FIG. 4B is a bottom view of the top cap of the embodiment of FIG. 1B.

FIG. 4B is a bottom view of the top cap 106 of the embodiment of FIG. 1B. The central opening 419 for the outlet port 102, the notch 422 for the inlet port 104, and the notch 423 for the vent port 103 can be seen opening onto the bottom side of the top cap 106. The notch 423 for the vent is positioned at the deepest part of a thin slot 426 formed around the bottom edge of the top cap 106, which assists in venting and connects the inlet notch 422 to the vent notch 423.

In use, the flow pattern through the first embodiment is as follows. Liquid to be filtered enters through inlet port 104 of the head region 101, flows into opening 420 of the top cap, through inlet notch 422, and down the side of the bowl through channel 218. As it flows into the bowl, the liquid also flows inwards from all sides through the membrane 108, towards the core 109. Liquid also flows out of the bottom of channel 218 and sweeps the bottom of the bowl 105. After flowing inwards through the membrane 108, the filtered liquid flows through the cross hole 110, into passageway 419 of the top cap, and out through outlet port 102 of the head region 101. Gas bubbles within the liquid are collected at and vented through the vent port 103, which is connected to the inlet port 104 and the inlet side of the flow pattern. Bubbles rising out of the inlet side of the flow pattern may collect in slot 426 on the bottom side of the top cap 106, and rise via notch 423 into the passage 424 that leads to the vent port 103. Also, the inlet port 104 may be directly connected to the vent port 103 through a connection within the head region 101 (not shown). It will be appreciated that other flow patterns may be used in accordance with embodiments of the invention, such as inside-out flow patterns and tangential flow filtration patterns. The inlet, outlet, and vent ports, for example, may be located in different configurations than those depicted.

In a second embodiment according to the invention, there is provided a disposable filter device with reduced hold-up volume, broadly similar to the first embodiment, except that the bowl, core, and bottom cap are formed into a unitary structure. As used herein, "unitary" means formed of a single piece (for example, a single molded structure). Such an embodiment reduces hold-up volume, priming time, and cost, and increases venting efficiency by comparison with conventional devices. The unitary structure eliminates the need to sweep air from below the bottom cap. In addition, using a unitary structure for the bowl, core, and bottom cap helps to reduce manufacturing costs for the device.

A filter device according to the second embodiment may use several of the features discussed above for the first embodiment. For example, the filter device may have no cage or sleeve surrounding the filter; the filter device may use a tight fit between the outer diameter of the filter medium and the bowl, optionally with a fluid channel down the side of the bowl; the core of the filter device may have no grooves; the filter core may feature a minimal number of cross holes to convey fluid from the filter membrane to the outlet of the device, and at least one cross hole at or near the top surface of the filter core to assist in venting air through the filter membrane during priming of the device, and subsequently conveying fluid from the membrane to the outlet; the filter core flow channels may be matched to the inlet and outlet flow paths of the filter device according to the flow balancing principle discussed further below; and the filter's top cap may be joined to the device in a process that uses a fixturing pin.

Figure 5A:
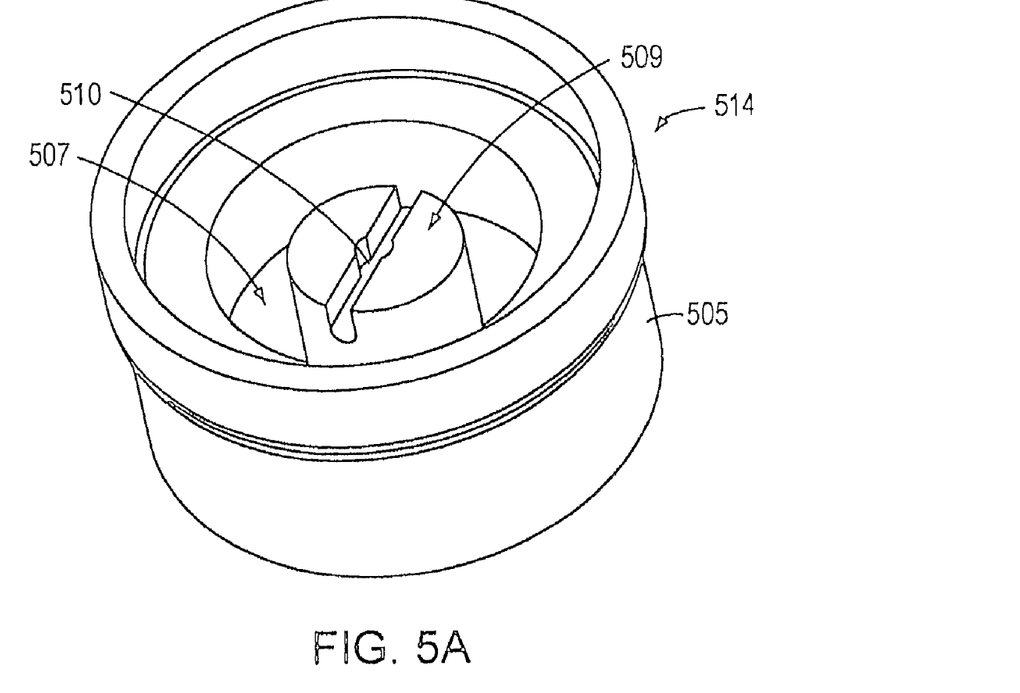
FIG. 5A shows a unitary bowl, core, and bottom cap for a filter device, according to a second embodiment of the invention.

FIG. 5A shows a unitary bowl, core, and bottom cap for a filter device, according to a second embodiment of the invention. In this embodiment, a unitary structure 514 includes a bowl 505, a core region 509, and a bottom cap region 507. The core region 509 includes a cross hole 510 at or near the top surface of the core for assisting with venting during priming, and subsequently conveying fluid to the outlet, in a similar fashion to the cross hole 110 of the embodiment of FIG. 1B. The unitary structure 514 may be molded, for example, of high density polyethylene.

Figure 5B:
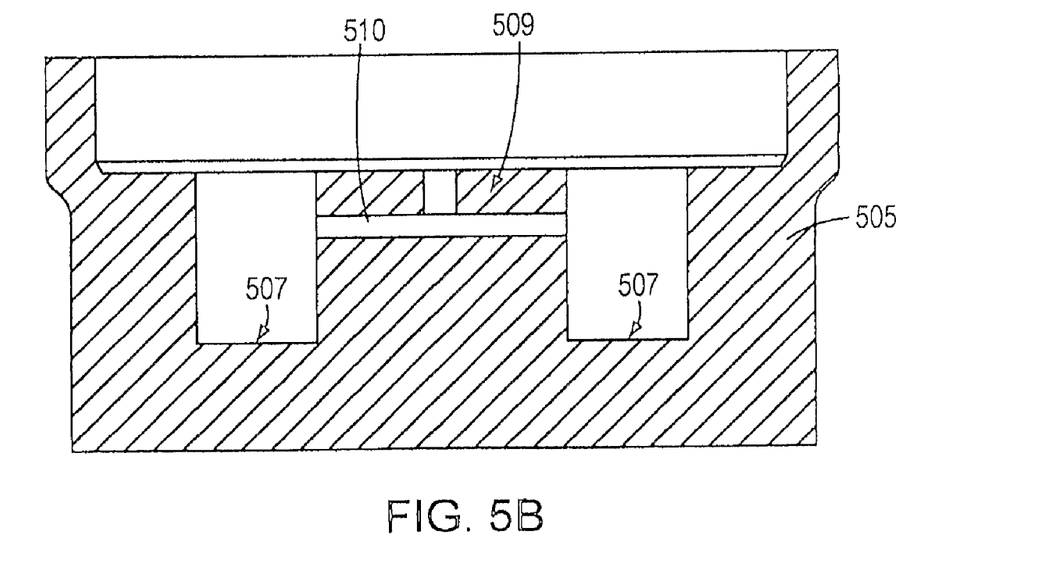
FIG. 5B shows a cross sectional view of the unitary bowl, core, and bottom cap of the embodiment of FIG. 5A.

FIG. 5B shows a cross sectional view of the unitary bowl, core, and bottom cap of the embodiment of FIG. 5A, showing bowl 505, core region 509, bottom cap region 507, and cross hole 510.

Figure 6A:
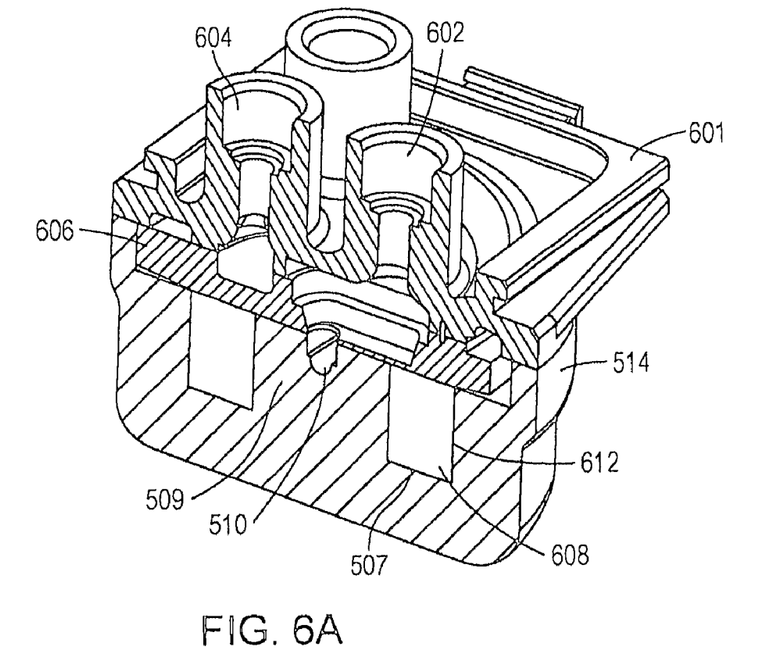
FIG. 6A shows a cross-sectional view of an assembled filter device using a unitary bowl, core, and bottom cap, according to the embodiment of FIGS. 5A and 5B.

FIG. 6A shows a cross-sectional view of an assembled filter device using a unitary bowl, core, and bottom cap, according to the embodiment of FIGS. 5A and 5B. A head section 601 similar to that of FIGS. 1A and 1B is fitted to the unitary bowl, core, and bottom cap 514. A filter membrane 608 is potted directly to the bottom of the bowl 507, while the core section of the bowl 509 has a cross hole 510 at or near its top surface. The filter membrane 608 may be similar to that of the embodiment of FIGS. 1A and 1B, and may be a pleated filter that forms a tight fit 612 with the inside of the bowl 505. A top cap 606 interfaces with the head section 601 and ports 602 and 604 in a similar fashion to that of the head section 101 and top cap 106 of FIG. 1B, with similar fluid flow patterns through the ports, top cap, filter membrane, and core as in the embodiment of FIG. 1B.

Figure 6B:
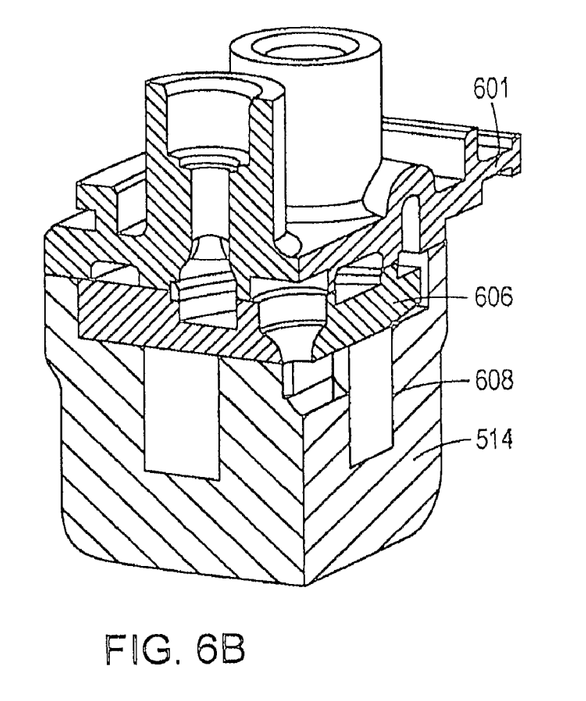
FIG. 6B shows a quartered section view of the assembled filter device of the embodiment of FIG. 6A.

FIG. 6B is a quartered section view of the assembled filter device of the embodiment of FIG. 6A, showing head section 601, top cap 606, filter membrane 608, and unitary bowl, core and bottom cap 514.

In accordance with an embodiment of the invention, the top cap and head section of a filter device (such as top cap 106 and head section 101 of FIG. 1B) may be designed to have equivalent diameters that match the inlet and outlet flow paths of the device according to a flow balancing principle.

Figure 7:
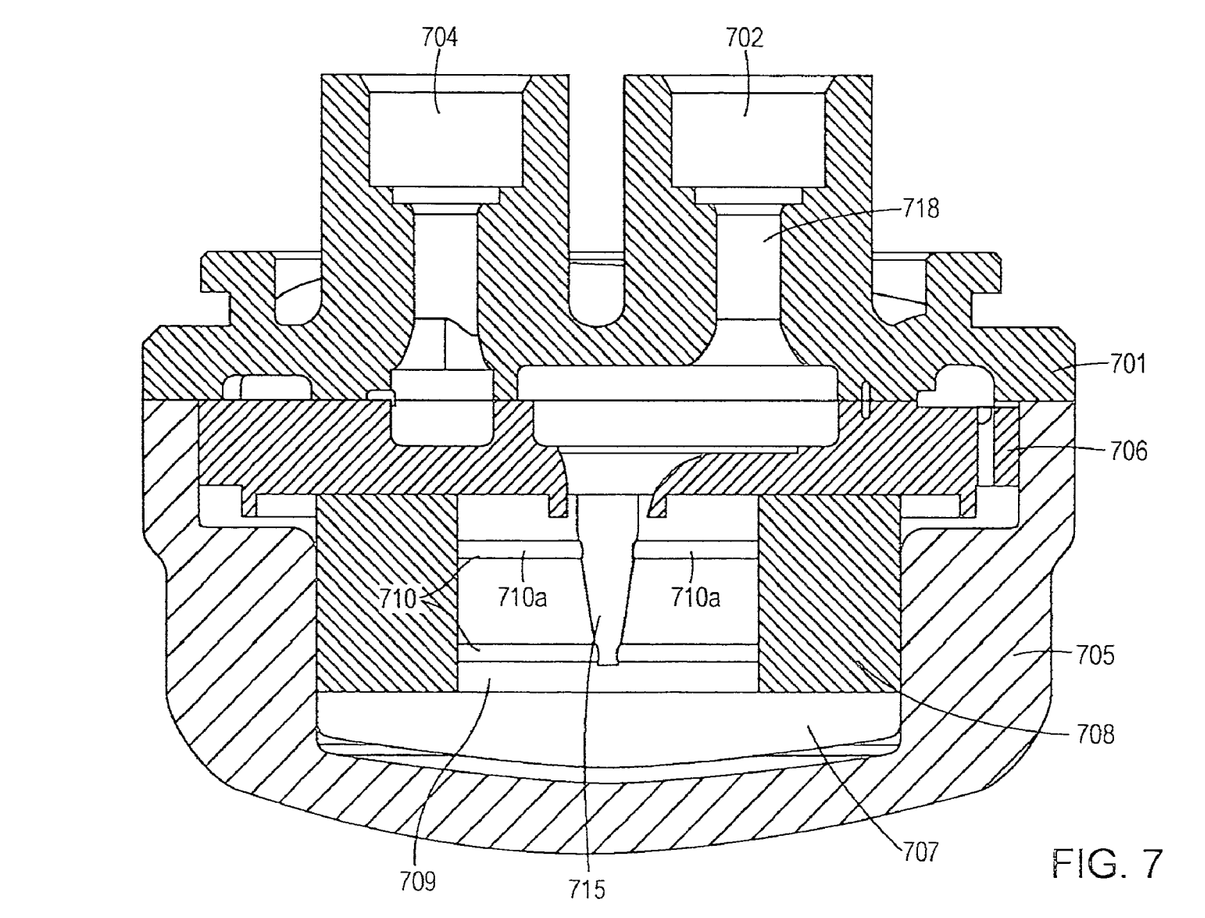
FIG. 7 is a cross-sectional view of a filter device comprising a core with a variable cross section flow outlet, in accordance with a third embodiment of the invention.

More generally, in accordance with an embodiment of the invention, fluid channels throughout the filter device may be sized such that their equivalent diameter for fluid flow does not exceed the smallest equivalent diameter of any of the ports, connections and/or tubing that are in fluid communication with the filter device (herein, "flow balancing"). By sizing and numbering the flow channels' size in such a way as to roughly equal the size of the plumbing that is in fluid communication with the device, the hold-up volume of the device can be minimized without adversely affecting the device's performance, such as by increasing its pressure drop. Generally, using consistent cross-sectional areas in the flow channels of a filter device according to an embodiment of the invention tends to minimize expansion and contraction pressure drops in the device, and creates less bubble entrapment and bubble nucleation sites. Various different possible techniques may be used to achieve flow balancing, including, for example, the technique discussed below in connection with FIG. 7. For circular fluid passages having laminar flow, a cross-sectional area may typically be used to determine an equivalent diameter; or, for turbulent flow through a non-circular passage, a hydraulic diameter DH may be used, where $$D_H = \frac{4A}{P}$$

for cross-sectional area A and perimeter P of the passage. Other expressions may also be used to determine an equivalent diameter, such as formulations published by ASHRAE (the American Society of Heating, Refrigeration, and Air-Conditioning Engineers) or other standards organizations, for example for determining the equivalent diameter of a rectangular duct. For multiple cross holes in a core, for example, the sum of the equivalent diameters of the cross holes may be made to equal the equivalent diameter of the smallest liquid port.

In accordance with a third embodiment of the invention, a filter device that is broadly similar to the first and second embodiments may feature a core with a variable cross section flow outlet, to take advantage of the flow balancing principle described above. In the third embodiment, as each cross hole in the core intersects the core's outlet flow path, the core's outlet flow path increases in diameter. The core's outlet flow path can be either tapered or stepped.

FIG. 7 is a cross-sectional view of a filter device comprising a core with a variable cross section flow outlet in accordance with a third embodiment of the invention. In a similar fashion to the first and second embodiments, a filter cartridge comprising a top cap 706, filter membrane 708, bottom cap 707, and core 709 is enclosed in a bowl 705 and head section 701, which comprises ports 702 and 704. However, in the core 709 of the embodiment of FIG. 7, cross holes 710 intersect with an outlet flow path 715 from the core that has a variable cross section. Using the flow balancing principle described above, if D is defined to be the smallest diameter liquid connection, port, or plumbing that is in fluid communication with the filter device, then the maximum inside diameter $D_C$ of the variable cross section flow path 715 should be made to equal D, i.e., $$D_C = D$$

under the flow balancing principle given above. Preferably, the variable cross section flow path 715 should vary smoothly from an initial cross-sectional diameter as near as practical to zero (in FIG. 7, towards the bottom of the core 709), to a maximum cross-sectional diameter of $D_C$ (in FIG. 7, at the top surface of the core 709). Also, the cross holes 710 (of which there may be one, two, or more) should be spaced and sized such that they intersect the outlet flow path 715 when the diameter of the outlet flow path 715 is equal to the equivalent diameter of the number of cross holes that have already intersected the outlet flow path 715. Specifically, the cross section d of each cross hole should be $$d = \frac{Dc}{N}$$

where N is the total number of cross holes; and, after the i-th cross hole, the cross sectional diameter $D_{C,i}$ of the outlet flow path 715 should be $$D_{C,i} = id$$

It should be appreciated, in applying the flow balancing principle described above, that each cross hole 710 is taken as extending all the way across the core 709, despite having two sections 710a and 710b of the cross hole on either side of the outlet flow path 715. In considering the equivalent diameter of the cross holes and the other flow channels of the device, the smallest portion of such channels should be considered. For instance, constriction 718 in the outlet flow path should be considered as the smallest diameter of the outlet flow path. The smallest portion of the inlet and outlet flow paths may be within the device as at 718. Only the liquid flow paths should be considered in the flow balancing, and not the vent flow path, assuming that it is the pressure drop for liquid flow that is of interest.

Using such an arrangement as in the embodiment of FIG. 7, fluid to be filtered flows through the filter membrane 708, inwards through cross holes 710, and into the outlet flow path 715. It should be appreciated that the outlet flow path 715 may vary in other ways than that shown in FIG. 7 and described in the equations above; for example, the cross section of the outlet flow path 715 may change in a stepwise or other discontinuous manner, and may vary linearly or non-linearly.

Figure 8:
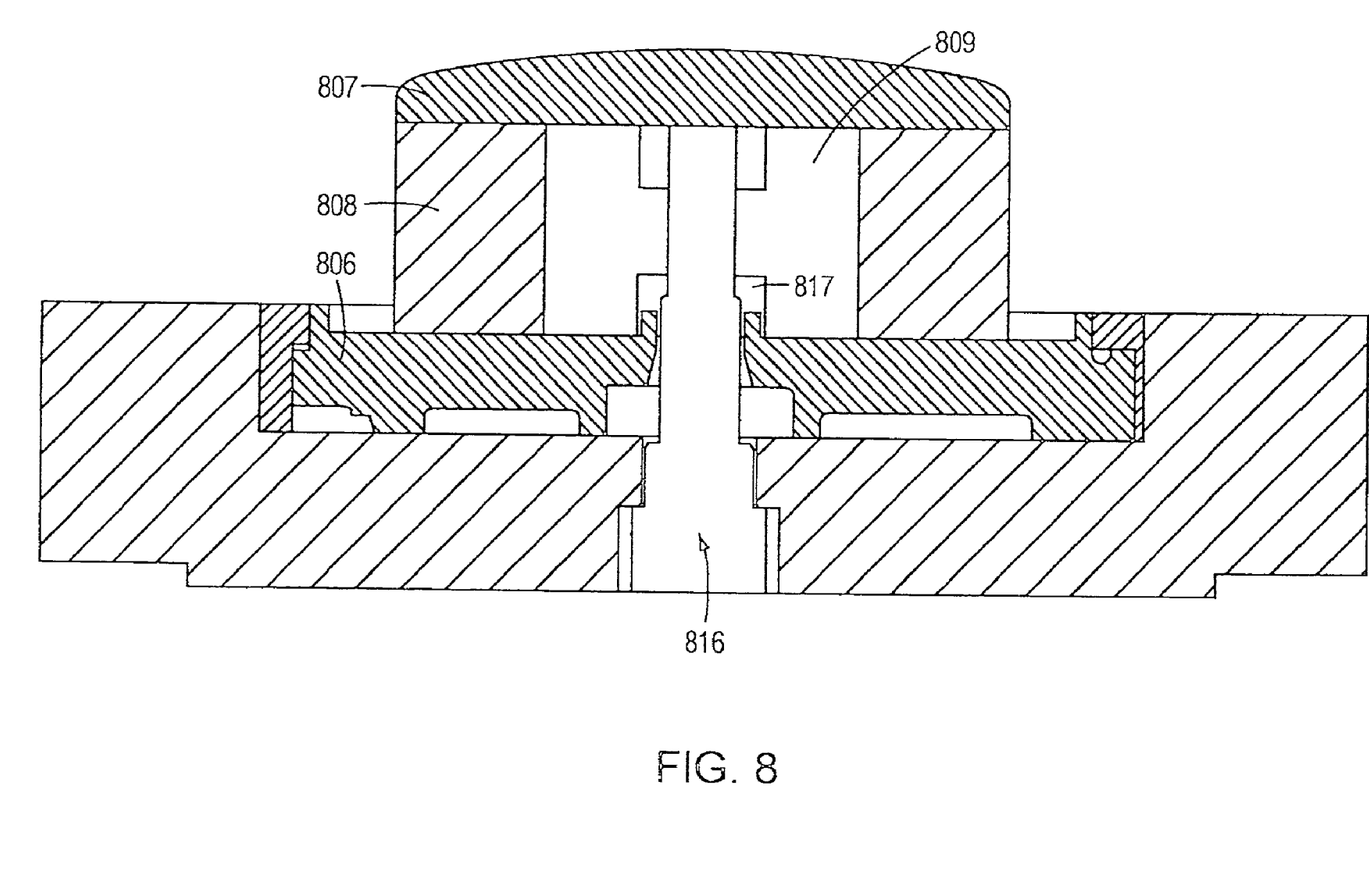
FIG. 8 is a cross-sectional view illustrating a manufacturing process in which a top cap is joined to the filter membrane and core using a fixturing pin, in accordance with an embodiment of the invention.

FIG. 8 is a cross-sectional view illustrating a manufacturing process in which a top cap is joined to the filter membrane and core using a fixturing pin, in accordance with an embodiment of the invention. In this embodiment, a top cap 806, filter membrane 808, bottom cap 807, and core 809 are used in a filter device similar to the embodiments described herein. In conventional manufacturing processes, the top cap is heated for sealing to the membrane, which often results in molten waste plastic intruding into the flow passages as the parts are sealed together. The hardened waste plastic may remain in the finished device and degrade the device's performance. In order to avoid this, a manufacturing process in accordance with an embodiment of the invention uses a fixturing pin 816 to fill up the central flow passage of the device while the top cap is being joined to the device. Because the fixturing pin 816 fills up the flow passage, the molten plastic may only flow into a limited counter bore space 817, so that as little waste plastic as possible interferes with the fluid flow path. Chamfered edges may also be used to receive the molten plastic. The fixturing pin 816 is then removed once the manufacturing step is complete.

Using embodiments in accordance with those described herein a filter device may have a significantly decreased hold-up volume, without an appreciable increase in pressure drop, as compared with previous filter devices. Techniques described herein may also create less bubble entrapment and bubble nucleation sites. Overall, the filter device has a reduced priming time and a reduced volume.

Although pleated membranes have been referred to above, a variety of different possible types of membranes may be used in accordance with embodiments of the invention. For example, microporous, ultrafiltration, or reverse osmosis membranes may be used, and may be made from various materials, including polymers, metals, ceramics, glass and carbon; and may also be used as support structures for adsorptive resins, or be surface modified by the attachment of chemical moieties to act as adsorptive media. Other features that may be used include spiral wound and disc filter elements; membranes made of any number of polymers, such as polytetrafluoroethylene, polycarbonate, polypropylene, polyethersulfone and polyvinylidene fluoride, as well as stainless steel and ceramic membranes; membranes with active adsorbents trapped within the structure of the membrane or attached to the membrane surfaces (e.g., ion exchange resins, activated carbon, ligands for specific solutes); epoxy sealed filter elements; connecting ports at right angles to the body of the housing, as well as connecting ports that may not be parallel to each other. It should also be recognized that even though reference has been made to the needs of the semiconductor industry, other industries have similar requirements, as for example the nuclear, biological, biotechnological, and pharmaceutical industries, in which safety, containment and ease of filter replacement are also critical.

It should be appreciated that although first, second, etc. embodiments have been referred to herein, inventive features of each described embodiment may be used separately or in combination, in accordance with the invention.

While this invention has been particularly shown and described with references to preferred embodiments thereof, it will be understood by those skilled in the art that various changes in form and details may be made therein without departing from the scope of the invention encompassed by the appended claims.

What is claimed is:

1. A filter device for liquid filtration, the device comprising:
    a filter bowl;
    a filter membrane contained within the filter bowl;
    a head section comprising at least one inlet connector and at least one outlet connector; and
    a filter core surrounded by the filter membrane, an outside surface of the filter core and an inside surface of the filter bowl forming a tight fit with the filter membrane, the filter core comprising a cross hole extending across the diameter of the filter core and being open on both of its ends to fluid communication with the filter membrane, the outside surface of the filter core not permitting fluid communication of the filter membrane with an internal core volume of the filter core except via the cross hole;
    an equivalent fluid flow diameter of the cross hole, an equivalent fluid flow diameter of the inlet connector and an equivalent fluid flow diameter of the outlet connector being roughly equal to each other; and
    the cross hole being located at or near a surface of the filter core nearest to the head section and being in fluid communication with the at least one outlet connector.

2. A filter device according to claim 1, further comprising a bottom cap of the filter membrane, the bottom cap supporting the filter membrane, the filter core, bottom cap, and filter bowl being formed into a unitary structure.

3. A filter device according to claim 1, wherein the filter bowl comprises a fluid channel within and along the inside of the filter bowl and in fluid communication with an inside surface of the filter bowl that is on the opposite end of the filter device from the head section, the fluid channel extending a length along the inside of the filter bowl from a top cap of the filter device that opens into the head section, to the inside surface of the filter bowl that is on the opposite end of the filter device from the head section, and guiding fluid along the length.

4. A filter device according to claim 3, wherein the fluid channel comprises a variable cross sectional area.

5. A filter device according to claim 4, wherein the cross sectional area of the fluid channel reaches a minimum nearest the inside surface of the filter bowl that is on the opposite end of the filter device from the head section.

6. A filter device according to claim 1, wherein an external surface of the filter core is grooveless.

7. A filter device for liquid filtration, the filter device comprising:
    a filter bowl;
    a filter membrane contained within the filter bowl;
    a head section comprising at least one inlet connector and at least one outlet connector; and
    a filter core surrounded by the filter membrane, an outside surface of the filter core and an inside surface of the filter bowl forming a tight fit with the filter membrane, the filter core comprising a cross hole extending across the diameter of the filter core and being open on both of its ends to fluid communication with the filter membrane, the outside surface of the filter core not permitting fluid communication of the filter membrane with an internal core volume of the filter core except via the cross hole;
    the cross hole being located at or near a surface of the filter core nearest to the head section and being in fluid communication with the at least one outlet connector.

8. A filter device according to claim 7, wherein the internal core volume is in fluid communication with the outlet connector, and wherein the internal core volume has an equivalent fluid flow diameter that is roughly equal to an equivalent fluid flow diameter of the inlet connector and is roughly equal to an equivalent fluid flow diameter of the outlet connector.

9. A filter device according to claim 7, wherein the internal core volume is of a variable cross sectional diameter.

10. A process for manufacturing a filter device, the process comprising:
   heating a top cap of the filter device to an elevated temperature at which a filter membrane may be joined to the top cap;
   inserting a fixturing device into an internal flow passageway of the filter device;
   joining the filter membrane to the top cap at the elevated temperature; and
   removing the fixturing device after the top cap has cooled below the elevated temperature;
   the filter device, when manufactured, comprising:
      a filter bowl;
      a filter membrane contained within the filter bowl;
      a head section comprising at least one inlet connector and at least one outlet connector; and
      a filter core surrounded by the filter membrane, an outside surface of the filter core and an inside surface of the filter bowl contacting the filter membrane, the filter core comprising a cross hole extending across the diameter of the filter core and being open on both of its ends to fluid communication with the filter membrane;
   the cross hole being located at or near a surface in a top surface of the filter core nearest to the head section and being in fluid communication with the at least one outlet connector.

* * * * *